US007702762B1

(12) United States Patent
Jagana

(10) Patent No.: US 7,702,762 B1
(45) Date of Patent: Apr. 20, 2010

(54) SYSTEM FOR HOST-TO-HOST CONNECTIVITY USING FICON PROTOCOL OVER A STORAGE AREA NETWORK

(75) Inventor: Venkata R. Jagana, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 2415 days.

(21) Appl. No.: 09/686,049

(22) Filed: Oct. 11, 2000

(51) Int. Cl.
G06F 15/173 (2006.01)
(52) U.S. Cl. .................. 709/223; 709/246; 709/249; 370/466
(58) Field of Classification Search .................. 709/249, 709/246, 223, 224, 217, 219; 370/465–467
See application file for complete search history.

(56) References Cited

U.S. PATENT DOCUMENTS

| 5,867,648 | A  | * | 2/1999  | Foth et al. .............. 709/230 |
| 6,199,112 | B1 | * | 3/2001  | Wilson .................. 709/227 |
| 6,400,730 | B1 | * | 6/2002  | Latif et al. ............. 370/466 |
| 6,493,825 | B1 | * | 12/2002 | Blumenau et al. ......... 713/168 |
| 6,499,058 | B1 | * | 12/2002 | Hozumi .................. 709/225 |
| 6,636,529 | B1 | * | 10/2003 | Goodman et al. .......... 370/469 |
| 6,654,830 | B1 | * | 11/2003 | Taylor et al. ............ 710/74 |
| 6,658,540 | B1 | * | 12/2003 | Sicola et al. ............ 711/162 |
| 6,665,714 | B1 | * | 12/2003 | Blumenau et al. ......... 709/222 |
| 6,684,209 | B1 | * | 1/2004  | Ito et al. ................ 707/9 |
| 6,714,952 | B2 | * | 3/2004  | Dunham et al. ........... 707/204 |
| 6,718,347 | B1 | * | 4/2004  | Wilson .................. 707/201 |
| 6,728,803 | B1 | * | 4/2004  | Nelson et al. ............ 710/60 |
| 6,769,021 | B1 | * | 7/2004  | Bradley ................. 709/220 |
| 2003/0236945 | A1 | * | 12/2003 | Nahum .................. 711/114 |

OTHER PUBLICATIONS

Computer Desktop Encyclopedia entry for "SAN" (copyright 1981-2004), version 17.4, 4th Quarter 2004.

* cited by examiner

Primary Examiner—Lashonda T Jacobs
(74) Attorney, Agent, or Firm—Jason O. Piche

(57) ABSTRACT

The invention comprises a system for providing host-to-host connectivity through use of SAN. In the preferred embodiment, the end-to-end host connectivity is accomplished through the FICON protocol, over the Fiber Channel layered stack on a standard Fiber Channel adapter that runs transparently across the SAN infrastructure.

26 Claims, 8 Drawing Sheets

SYSTEM FOR HOST-TO-HOST CONNECTIVITY USING FICON PROTOCOL OVER A STORAGE AREA NETWORK

BACKGROUND OF THE INVENTION

1. Technical Field

This invention relates to network connectivity between host computer systems over storage area networks (SANs) using the SAN's network protocol such as the FICON protocol.

2. Description of the Prior Art

Network architecture is a blueprint that is used to guide the design and implementation of networks. These blueprints are used because networks are not fixed at a single point in time, but evolve to accommodate changes in both the underlying technologies upon which they are based as well as changes in the demands placed on them. The primary function of a network is to provide general cost-effective, robust and high-performance connectivity among a large number of computers.

Channels and networks are the two primary ways that data is transferred between devices such as processors, and peripherals such as printers. Channels transfer data through switched or direct point-to-point connections and they work by creating a fixed connection between the source and destination devices until the transfer is complete. Channels transfer data at high speeds and are very economical. Networks, on the other hand are collections of nodes such as processors, print devices and workstations. Connections on networks are slower than those made via channels. Channels work best among few devices, and connect via predefined addresses. Networks, on the other hand, can handle multiple requests among multiple connections. Fibre Channel (FC) is a hybrid of both network and channel methods and combines the best aspects of both.

Host to host connectivity within a high-speed network environment is typically accomplished by using several different types of network media. Network media include Token Ring and Ethernet and other topologies. Token Ring is a physical network technology in which hosts are connected in a ring. A token (bit pattern) circulates around the ring and a given node must possess the token before it is allowed to transmit. Token Ring has a bandwidth of 4 and 16 Mbps (megabits per second). Fiber Distributed Data Interface (FDDI) is a high-speed token ring networking technology designed to run over optical fiber. The cables used for the token ring network are attached to adapters instead of the hosts themselves. Ethernet is a network technology that uses CSMA/CD (Common Sense Multiple Access) and has a bandwidth of 10 Mbps or 100 Mbps. The Ethernet protocol is implemented in hardware on the network adapter.

A SAN is a dedicated, centrally managed, secure information infrastructure which enables any-to-any interconnection of servers and storage systems. SANs allows for connection between storage devices and host machines across greater distances than are possible on a traditional local area network (LAN). SANs enable users to store large volumes of data at remote locations called libraries. SANs are rapidly being integrated into distributed environments using Fibre Channel technology.

Fibre Channel (FC) is a high speed (1.06 Gbps) medium used for data transfer and storage. It is essentially a serial data channel created over fiber optic cabling. Fibre Channel provides a logical bi-directional, point to point connection between a host and a device. Just as existing networking technologies using LAN/WAN (Local-Area-Network/Wide-Area-Network) utilize configurations connected to PCs, servers, print and storage devices, so too does FC. However, because FC uses fiber optic cabling, connections along a FC network are possible. Another feature of FC is its ability to provide increased bandwidth over communications channels.

ESCON (Enterprise Systems Connection) is a fiber-based protocol. The ESCON protocol allows various emulations to run on top of it for further communication with the mainframe either directly or indirectly through ESCON emulators. However, in order to perform this connectivity, the non-mainframe hosts need a separate ESCON hardware adapter, as well as other limitations.

ESCON based physical channel speeds are 17 Mbps. ESCON network connectivity is usually accomplished through ESCON directors and hence the distances between the end-hosts are limited. ESCON requires a repeater every 1.86 miles. This requirement leads to increased costs when the machines or hosts that are to be connected are far apart.

By comparison, FICON (Fibre Connectivity) Channel is a protocol that is targeted to provide high-speed storage Input/Output (I/O) capability. FICON provides a theoretical throughput of 100 Mbytes/sec, which allows it to be used in a SAN (Storage Area Network) environment.

Addressing the need for a centralized storage management solution across heterogeneous networked resources, FC SAN architecture benefits a typical networked environment by delivering a dedicated storage environment, and by using of high-speed fiber-optic or copper cabling to interconnect servers, workstations and storage devices.

As a data-channel network standard, the FC backbone of a SAN environment contains the network features that provide connectivity, distance and protocol multiplexing.

Because FC SANs are protocol-independent, the support for network protocols like Tansmission Control Potocol/Iternet Potocol (TCP/IP) and audio/video is accomplished with a single physical layer. FC allows concurrent communication among workstations, mainframes, servers, data storage systems and other peripherals using SCSI and IP protocols. The interconnectivity of computers and storage devices forms the basis of a SAN.

Although FC SAN is a fiber-based solution for high-speed storage access, there remains an industry need for high-speed, host to host connectivity that is an improvement upon the existing ESCON based architecture.

SUMMARY OF THE INVENTION

The invention comprises a system and method for providing host-to-host connectivity through use of SAN. In the preferred embodiment, the end-to-end host connectivity is accomplished through the FICON protocol, over the Fibre Channel layered stack on a standard Fibre Channel adapter that runs transparently across the SAN infrastructure.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Host-to-host connectivity through SAN offers several technological advantages over the prior art. The new architecture is capable of higher bandwidths and, therefore, higher speeds. There is no longer a need for new FICON hardware, but rather the new architecture uses industry-proven FC hardware. Hardware proofing cycles are eliminated, and there is no device driver development required in the present invention. Therefore, resulting in a significant reduction in the development life-cycle of the product. The new architecture uses the existing emulation software layers and Fibre Channel stack, and the new architecture offers improved connectivity at reduced costs.

Technical Background

Figure 1:
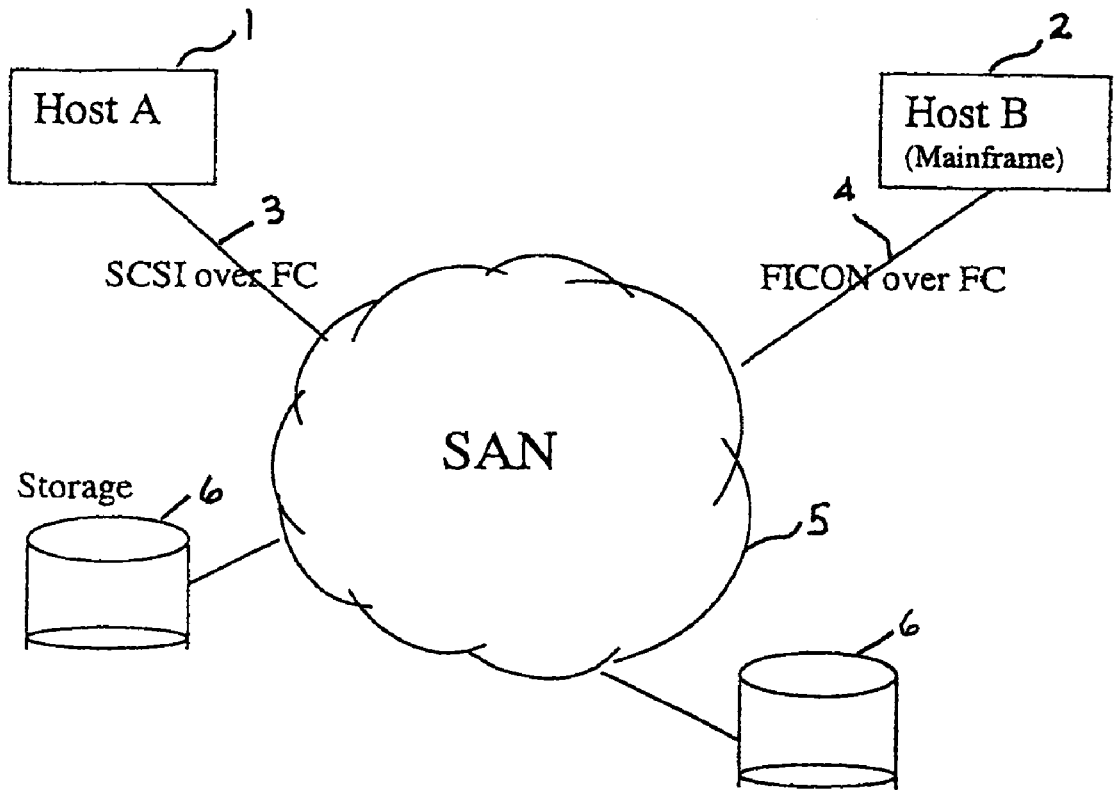
FIG. 1 is a diagram of a SAN connection according to the prior art.

FIG. 1 depicts the prior art connectivity that utilizes a SAN. Host A 1 is able to share data storage 6 with Host B 2, which could be a mainframe through the SAN 5. Host A 1 utilizes the SCSI protocol over FC 3 while communicating with SAN 5, while Host B 2 utilizes the FICON protocol over FC 4. However, this configuration does not support direct Host A to Host B communications.

Figure 6:
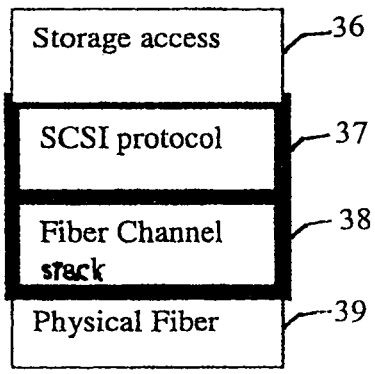

The prior art network architecture that would support the connection 3 between Host A 1 and the SAN 5 of FIG. 1 is depicted in FIG. 6. The physical fiber 39 are the cables preferably fiber optic. The fibre channel stack 38 is a protocol layered stack and SCSI 37 is a protocol layer on top of the fibre channel stack. The Physical fiber and stacks provide the means or channel for communications to the storage access 36.

Figure 2:
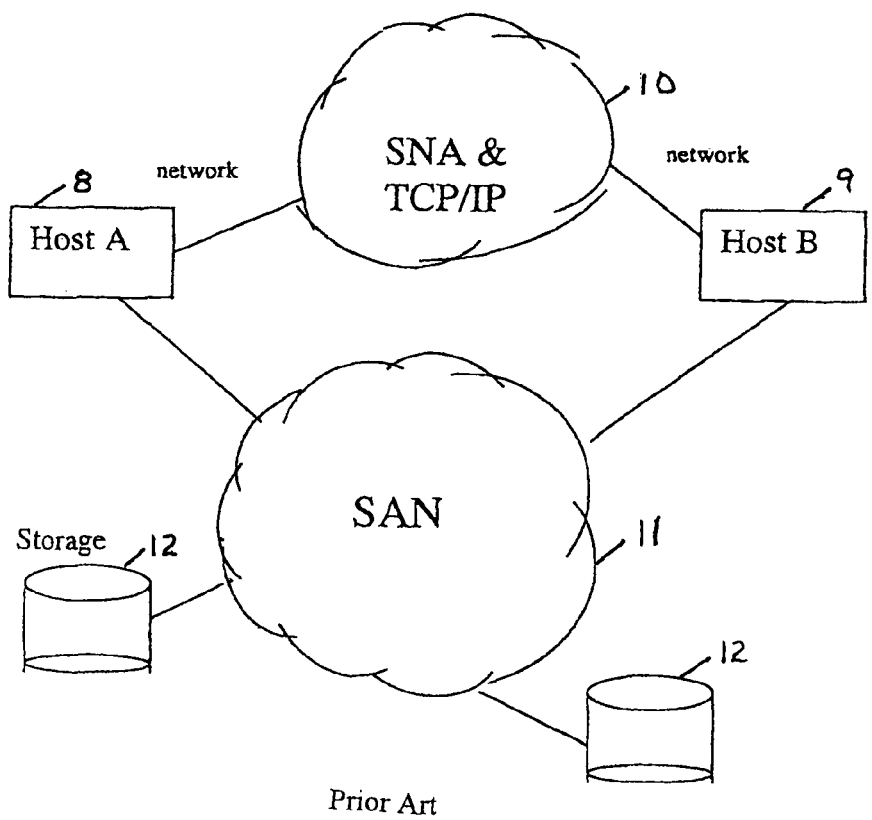
FIG. 2 is a diagram of SNA & TCP/IP over SAN.

The prior network configuration that would support direct communications between two hosts is depicted in FIG. 2. In order for Host A 8 to communicate directly with Host B 9 in either a local area network (LAN environment or wide-area-network (WAN) and still maintain access with storage 12 through the SAN 11. The SNA & TCP/IP protocol channel 10. Host A 8 and Host B 9 are connected to storage 12 through the SAN 11.

Figure 7:
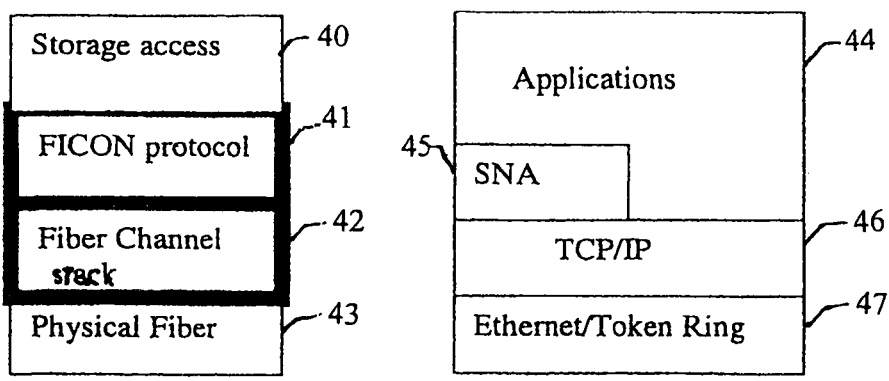

FIG. 7 depicts the architecture for both the SAN and LAN/WAN networks. The architecture for the SAN utilizes the FICON protocol 41. The LAN or WAN network connection between Host A 8 and Host B 9 is facilitated by the architecture consisting of the Ethernet or Token Ring 47, TCP/IP 46, SNA 45 and the applications 44. Note the additional hardware and protocols that are needed in order to provide host to host communication and to access applications.

Figure 3:
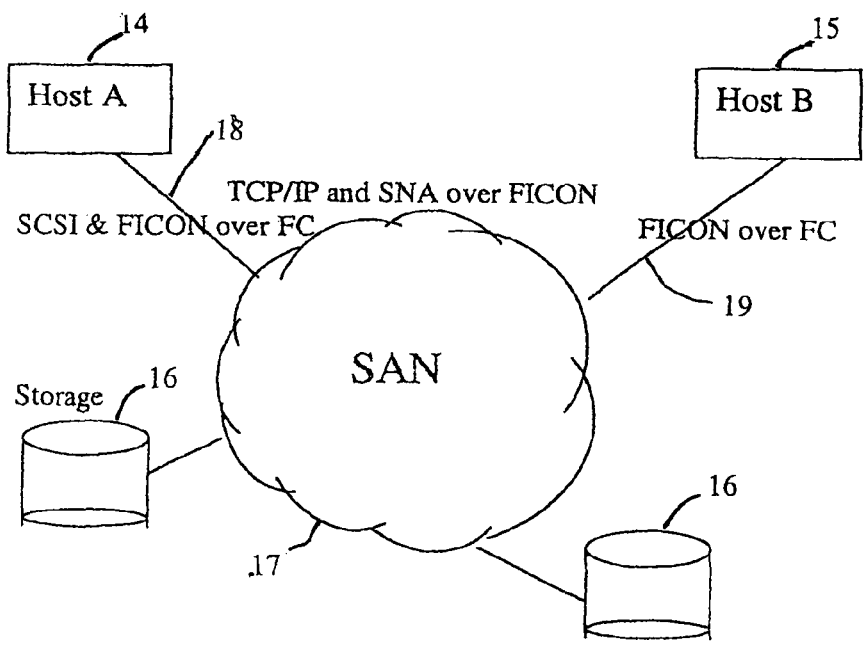
FIGS. 3 and 4 are diagrams of host-to-host connectivity according to the present invention.

FIG. 3 depicts the network configuration according to the present invention that facilitate direct communication between two hosts through a SAN. The SAN 17 utilizes an architecture consisting of TCP/IP and system network architecture (SNA) over FICON. Host A 14 utilizes SCSI & FICON protocols over FC. Host B utilizes FICON protocol over FC. This connection scheme allows direct communication between Host A 14 and Host B 15 through the SAN 17.

Figure 4:
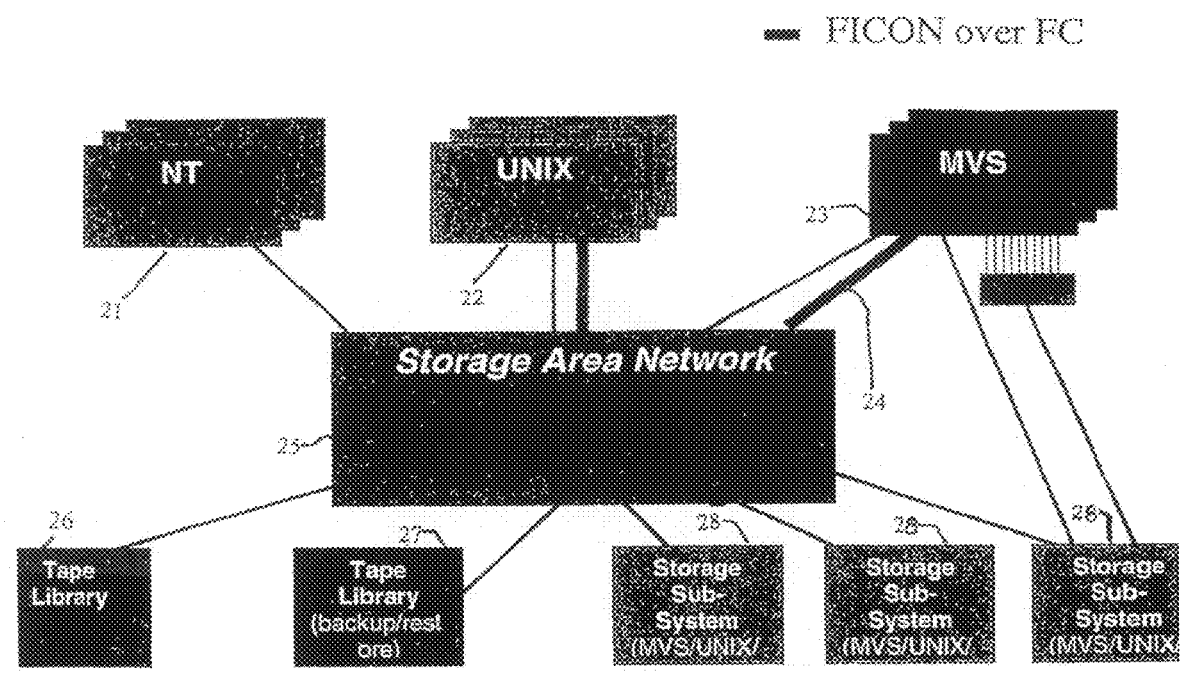

FIG. 4 is an example connection scheme that utilizes the present invention. The NT 21, Unix 22 and MVS 23 systems are used in this example of the preferred embodiment. Assume that the NT 21, UNIX 22 and MVS 23 systems are connected to the SAN 25 fabric through a standard Fiber Channel connection. On the UNIX system side, a separate FC adapter is dedicated for the host connectivity in order to avoid the FC cable/port sharing with the storage I/O activity on this system. The FICON protocol 24 runs over the Fibre Channel stack, and it is further required that it runs on both of these system objects of interest. After the FC2 level connection is established, the FICON protocol then runs end-to-end between these two systems, thus offering its services to the emulation layers on top of it. These emulation layers further provide the services to TCP/IP, SNA etc. which, ultimately service the applications. The layering architecture of the present invention is explained in FIG. 8.

In the preferred embodiment the SAN network is intended not only to perform storage IO, but the SAN can also perform host-to-host network connectivity without interfering with the storage IO activity. In the preferred embodiment the FICON protocol runs transparently as far as the SAN is concerned, and therefore, the SAN is not aware of the type of traffic that has been passing through. As shown in FIG. 3, the primary purpose of the FICON protocol is to perform the storage IO between the MVS systems and their storage systems, either directly or indirectly, through the SAN infrastructure at a much higher bandwidth than it is possible with ESCON.

Figure 5:
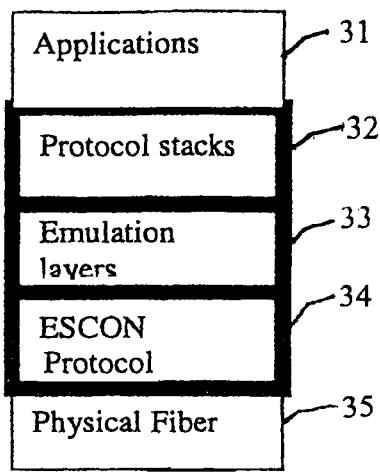
FIGS. 5-7 are block diagrams of prior art architecture.
Figure 8:
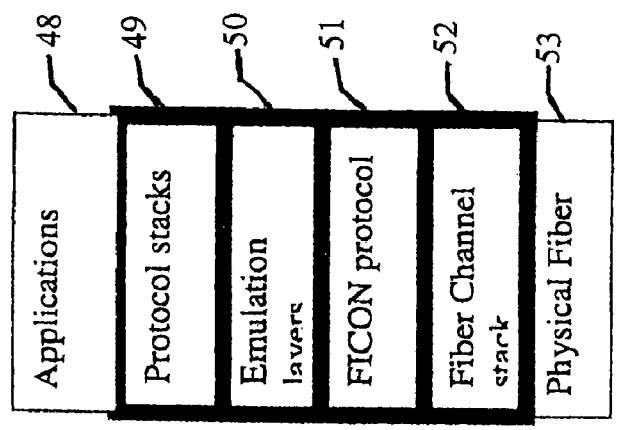
FIGS. 8-9 are block diagrams of the architecture of the present invention.

The network architecture of the present invention as shown in FIG. 8, provides a layered stack concept logically extending the FC layered stack. The new network architecture is a combination of the architectures in FIGS. 5 and 7. The physical fiber 53 embodies the network hardware. The fiber channel stack 52 is above the physical fiber. The FICON protocol 51 facilitates host communication with the SAN. The emulation layers 50 facilitate the imitation of other programs or devices. The protocol stacks 49 facilitate host-to-host communication and access to applications 48.

Figure 9:
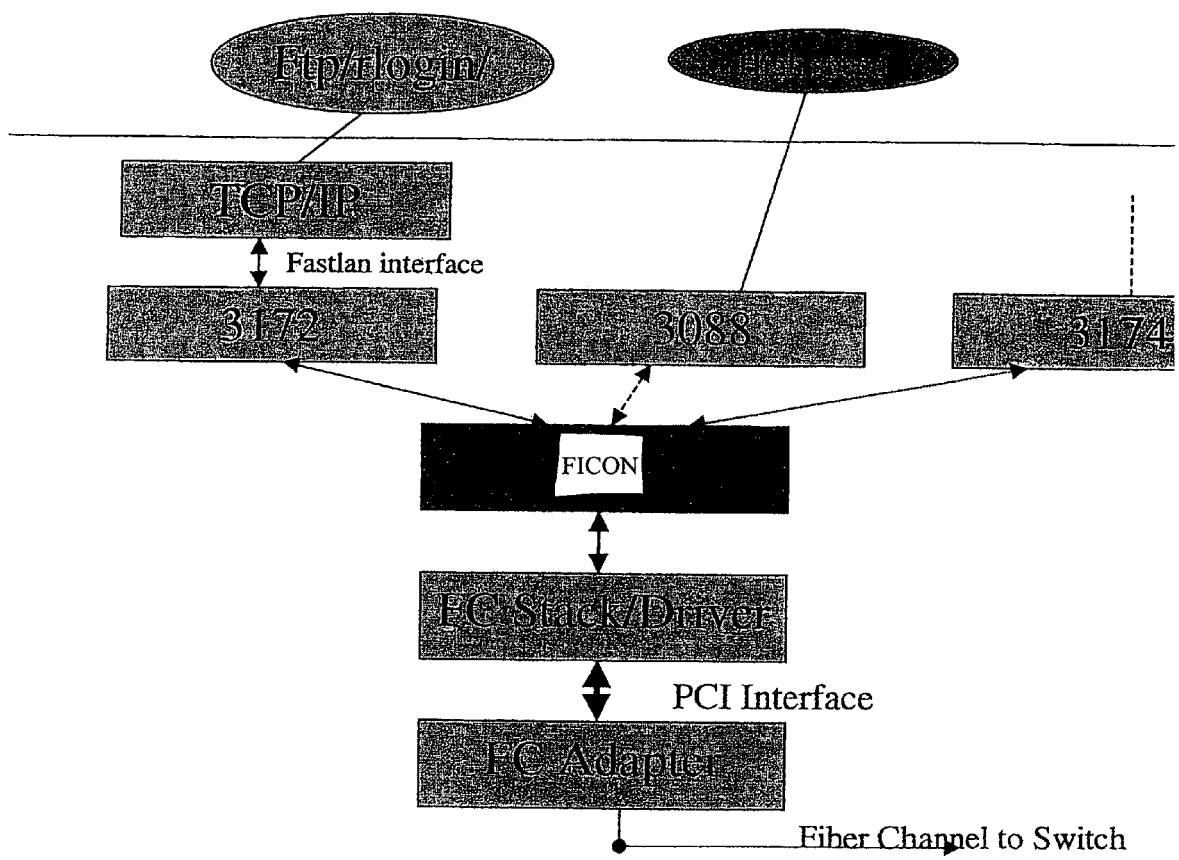

FIG. 9 is an example of the network architecture of the present invention. The FICON protocol 61 must run on top of the FC stack 62 which allows it to support different types of emulation such as, 3172 57, 3088 59 or 3174 60. Each emulation supports its relative function, such as TCP/IP 56 or high-speed file transfer application 55. After establishing a FICON level end-to-end connection, the respective emulations on both sides can exchange the communication for further support of their service users.

Figure 10:
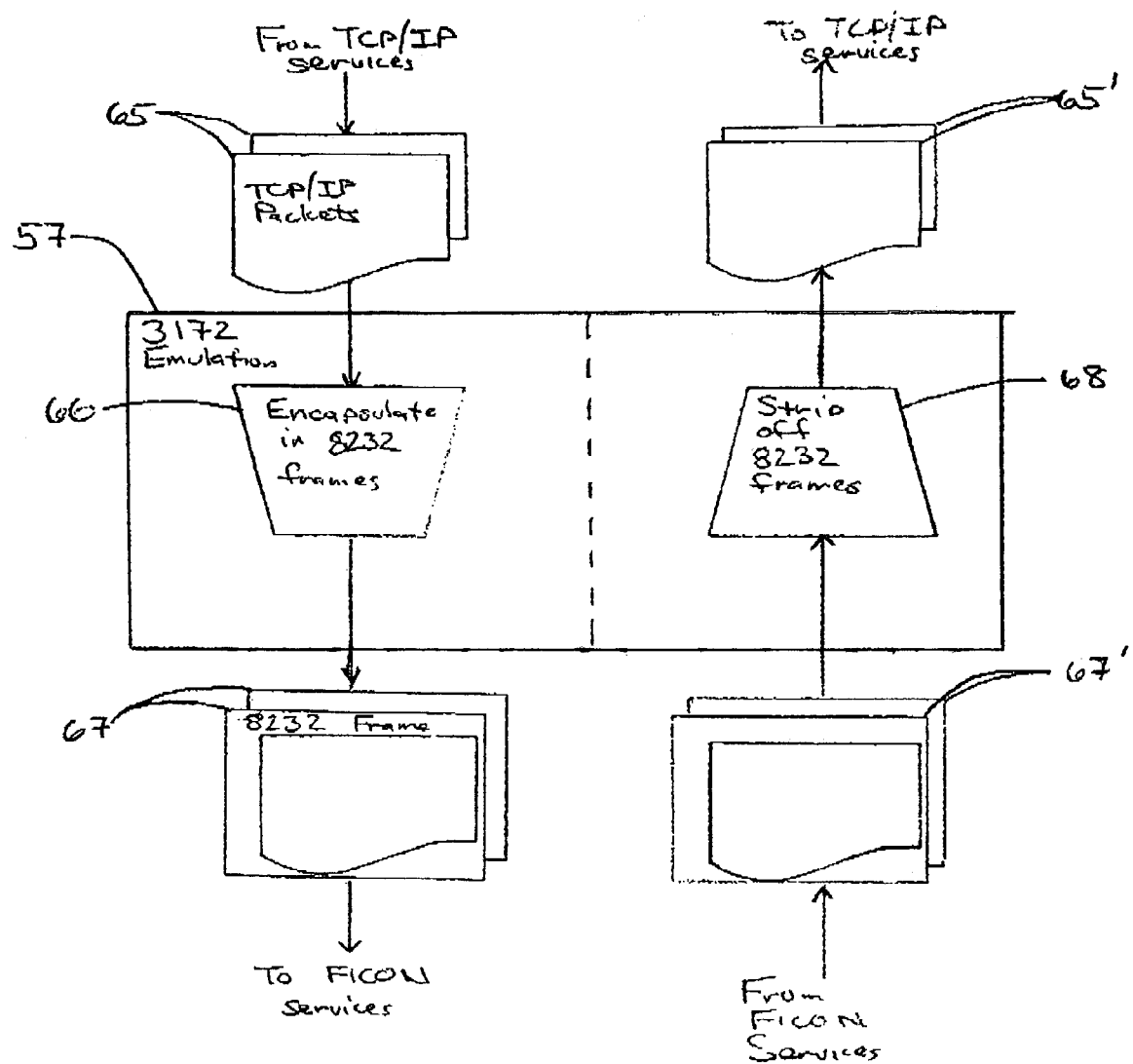
FIG. 10 is a schematic flow diagram of 3172 emulation according to the present invention.

FIG. 10 is an example of how an emulation layer would interface with the layer above and below it and in this example, 3172 emulation is considered for a detailed explanation of how it works. The 3172 emulation layer 57 utilizes the FICON services at the lower interface for communicating with its peer entities. However, the communication with the remote peer entities is performed through IBM standard 8232 protocol to support TCP/IP pass-through. At the upper interface of this emulation layer, a set of service primitives are provided so that the user of this emulation layer such as the TCP/IP stack in this particular case, could communicate using these primitives. The emulation layer 57 encapsulates the TCP/IP packets in 8232 protocol frames 66 with the 8232 protocol header 67 attached before transmitting them to a remote peer entity or services. The 8232 protocol frames 67 are then transmitted using the FICON layer. Similarly, the emulation layer will strip the 8232 header 68 from the received 8232 protocol frames from the underlying FICON layer before handing over the encapsulation and decapsulation, the emulation layer also handles the control frames to manage the 8232 protocol activity.

The 3172 emulation could support Ethernet, FDDI and Token Ring LAN types and accordingly, it exposes the appropriate interfaces to the TCP/IP stack above it.

ADVANTAGES OVER THE PRIOR ART

The present invention has an advantage over the prior art in that no special FICON based hardware adapters are required, unlike ESCON based architecture, in order to provide end-to-host network connectivity. Instead the FICON based architecture uses standard Fibre Channel adapters. This allows the SAN infrastructure to be leveraged for physical connectivity needs. Also, the distance between the end-hosts is no longer a limiting factor from a cost perspective because the connectivity can be easily extended at a very reduced price through WAN networks. Since no special hardware other than the standard Fibre Channel hardware adapter is required, there is a significant reduction in product development or test cycles. Also there is no additional cost associated with software driver development for the adapter. Ultimately the present invention will result in better time-to-market (TTM) of products, significant cost reductions and greater product flexibility.

Alternative Embodiments

Figure 11:
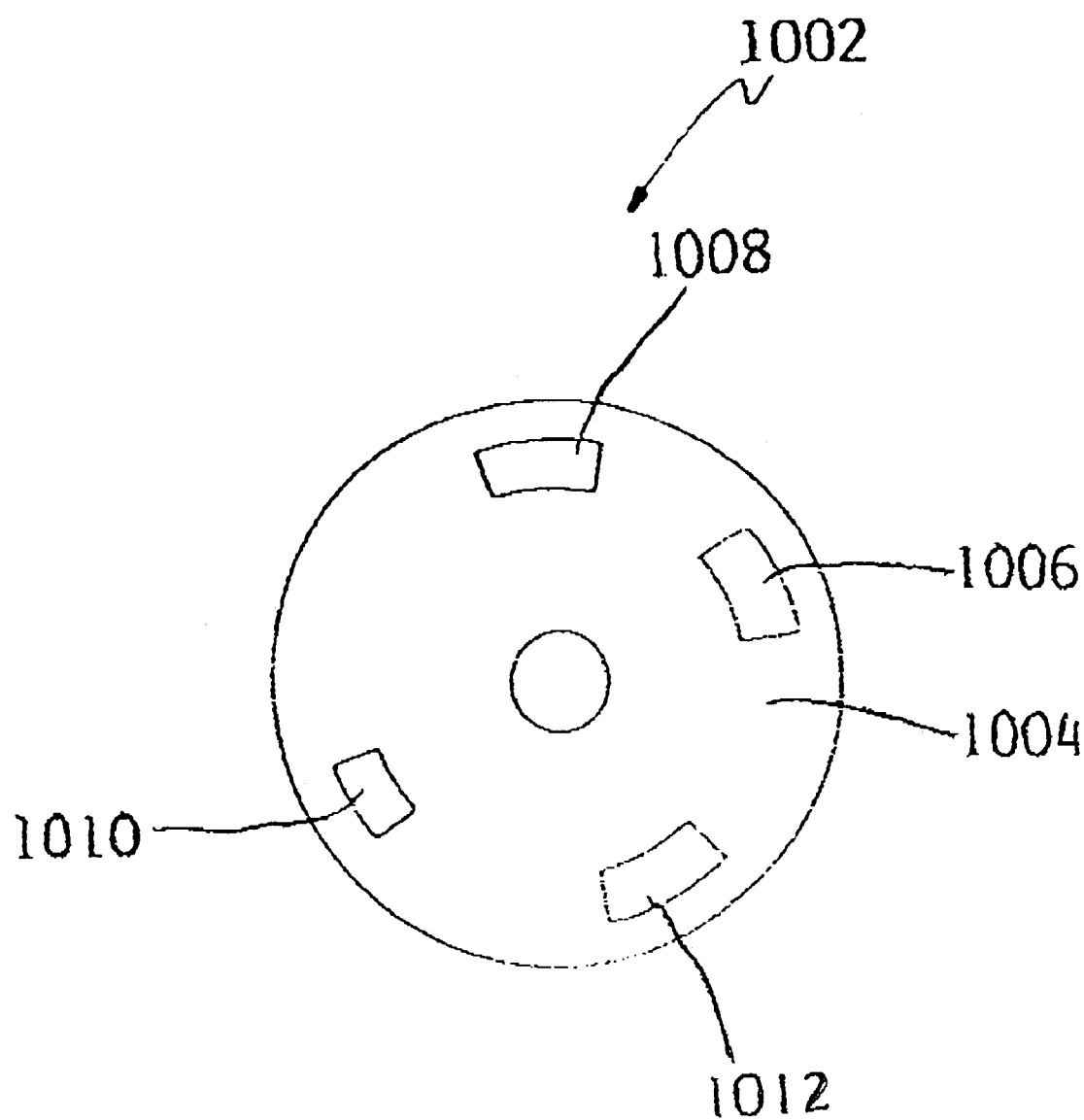
FIG. 11 is a CD-ROM bearing, a software embodiment of the invention.

FIG. 11 shows an article of manufacture or a computer program product including a signal bearing media for storing thereon program means for carrying out the method of this invention in the system of FIGS. 3 and 8. While the present invention has been described in the context of a system and method of operation, the mechanisms of the present invention are capable of being distributed as a program-product in a variety of forms, and the present invention applies equally regardless of the particular type of signal bearing media used to actually carry out the distribution. Examples of signal-bearing media include recordable media (such as digital and analog communications links, including fiber and wireless communications links).

An example of such an article of manufacture is illustrated in FIG. 11 as pre-recorded CD-ROM 1002. CD-ROM 1002 is intended for use with a data processing system, and includes optical storage medium 1004, and program means 1006, 1008, 1010 and 1012 recorded thereon for causing the system of FIGS. 3 and 8, to practice steps of this invention. It will be understood that such apparatus and articles of manufacture all fall within the spirit and scope of this invention.

It will be appreciated that, although specific embodiments of the invention have been described herein for purposes of illustration, various modifications may be made without departing from the spirit and scope of the invention. In particular, other protocols could be used over the SAN/FICON architecture. Accordingly, the scope of protection of this invention is limited only by the following claims and their equivalents.

I claim:

1. A system for communication between a first host and second host comprising:
    means for communicating between a first host and a storage area network using a storage area network protocol in a non-ESCON protocol manner, the storage area network including a plurality of storage devices exclusive of the first host;
    means for communicating between a second host and the storage area network using the storage area network protocol in a non-ESCON protocol manner, the storage devices exclusive of the second host; and
    means for communicating directly between the first and second hosts using the storage area network protocol in a non-ESCON protocol manner without passing through a storage device.

2. The system of claim 1, wherein the storage area network protocol is a FICON protocol.

3. The system of claim 1, wherein the means for communicating comprises:
    means at the first host for translating between the storage area network protocol and a host-to-host communications protocol selected from the group consisting of TCP/IP and SNA.

4. A system for facilitating the communications of a first host comprising:
    means for communicating with a second host using a storage area network protocol in a non-ESCON protocol manner; and
    means for communicating with a storage area network using the storage area network protocol in a non-ESCON protocol manner, the storage area network including a plurality of storage devices exclusive of the first host and the second host.

5. The system of claim 4, wherein the storage area network protocol is a FICON protocol.

6. The system of claim 4, wherein the means for communicating comprises:
    means for translating between the storage area network protocol; and
    communications protocol selected from the group consisting of TCP/IP and SNA.

7. A method for communicating between a first host and second host comprising:
    communicating between a first host and a storage area network using a storage area network protocol in a non-ESCON protocol manner, the storage area network including a plurality of storage devices exclusive of the first host;
    communicating between a second host and the storage area network using the storage area network protocol in a non-ESCON protocol manner, the storage devices exclusive of the second host; and
    communicating directly between the first and second hosts using the storage area network protocol in a non-ESCON protocol manner without passing through a storage device.

8. The method of claim 7, wherein the storage area network protocol is a FICON protocol.

9. The method of claim 8, wherein the step of communicating directly between the first and second hosts supports a high-speed file transfer application.

10. The method of claim 9, wherein the file transfer application is supported by 3088 emulation.

11. The method of claim 7, wherein the step of communicating between the first and second hosts comprises:
    the first host translating between the storage area network protocol and a host-to-host communications protocol.

12. The method of claim 11, wherein the host-to-host communications protocol is TCP/IP.

13. The method of claim 11, where the host-to-host protocol is SNA.

14. The method of claim 12, wherein the storage area network protocol is a FICON protocol.

15. The method of claim 14, wherein the step of communicating directly between the first and second hosts comprises:

encapsulating TCP/IP packets from the first host in 8232 protocol frames;

transmitting the 8232 protocol frames to the second host using the FICON protocol; and decapsulating the TCP/IP packets from the 8232 protocol frames at the second host.

16. A method for facilitating the communications of a first host comprising:

communicating with a second host using a storage area network protocol in a non-ESCON protocol manner; and communicating with a storage area network using the storage area network protocol in a non-ESCON protocol manner, the storage area network including a plurality of storage devices exclusive of the first host and the second host.

17. The method of claim 16, wherein the storage area network protocol is a FICON protocol.

18. The method of claim 16, wherein the steps for communicating comprise:

translating between the storage area network protocol and a communications protocol selected from the group consisting of TCP/IP and SNA.

19. An article for communicating between a first host and a second host comprising:

a tangible recordable data storage medium;

means in the medium for communicating between a first host and a storage area network using a storage area network protocol in a non-ESCON protocol manner, the storage area network including a plurality of storage devices exclusive of the first host;

means in the medium for communicating between a second host and the storage area network using a storage area network protocol in a non-ESCON protocol manner, the storage devices exclusive of the second host; and means in the medium for communicating between the first host and the second host using the storage are network protocol in a non-ESCON protocol manner.

20. The article of claim 19, wherein the storage area network protocol is a FICON protocol.

21. The article of claim 19, wherein the means in the medium for communicating comprises:

means in the medium at the first host for translating between the storage area network protocol; and a host-to-host communications protocol selected from the group consisting of TCP/IP and SNA.

22. The article of claim 19, wherein the medium is selected from the group consisting of magnetic, optical, biological and atomic data storage media.

23. An article for communicating with a first host comprising:

a tangible recordable data storage medium; and means in the medium for communicating with a storage area network, and with a second host using a storage area network protocol in a non-ESCON protocol manner, the storage area network including a plurality of storage devices exclusive of the first host and the second host.

24. The article of claim 23, wherein the storage area network protocol is a FICON protocol.

25. The article of claim 23, wherein the means in the medium for communicating comprises:

means in the medium for translating between the storage area network protocol; and means in the medium for a host-to-host communications protocol selected from the group consisting of TCP/IP and SNA.

26. The article of claim 23, wherein the medium is selected from the group consisting of magnetic, optical, biological and atomic data storage media.

* * * * *